US012458994B2

(12) United States Patent
Woodcox

(10) Patent No.: US 12,458,994 B2
(45) Date of Patent: Nov. 4, 2025

(54) WEAR RESISTANT DISTRIBUTOR POST

(71) Applicant: FANUC AMERICA CORPORATION, Rochester Hills, MI (US)

(72) Inventor: Andrew Woodcox, Holland, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 175 days.

(21) Appl. No.: 17/647,384

(22) Filed: Jan. 7, 2022

(65) Prior Publication Data

US 2022/0219186 A1 Jul. 14, 2022

Related U.S. Application Data

(60) Provisional application No. 63/137,279, filed on Jan. 14, 2021.

(51) Int. Cl.
*B05B 15/18* (2018.01)
*B05B 3/10* (2006.01)
*B05B 15/25* (2018.01)

(52) U.S. Cl.
CPC ............ *B05B 15/18* (2018.02); *B05B 3/1014* (2013.01); *B05B 15/25* (2018.02)

(58) Field of Classification Search
CPC ....... B05B 15/18; B05B 15/25; B05B 3/1014; B05B 5/0407; B05B 3/0164; B05B 3/1035; B05D 1/02
USPC ......... 239/223, 703, 224; 118/626, 629, 627
See application file for complete search history.

(56) References Cited

U.S. PATENT DOCUMENTS 3,224,680 A * 12/1965 Burnside ............... B05B 3/1057 239/223
4,360,155 A * 11/1982 Hubbell .................. B05B 5/032 239/3
4,838,487 A * 6/1989 Schneider ............ B05B 3/1064 239/223
6,189,804 B1 * 2/2001 Vetter ................... B05B 3/1014 239/293
6,328,224 B1 * 12/2001 Alexander ............ B05B 3/1014 239/708

(Continued)

OTHER PUBLICATIONS

"Types of Screw Heads and How to Select the Right One", US Microscrew, Sep. 2020 (Year: 2020).*

(Continued)

*Primary Examiner* — Qingzhang Zhou
*Assistant Examiner* — Kevin Edward Schwartz
(74) *Attorney, Agent, or Firm* — John A. Miller; Shumaker, Loop & Kendrick, LLP

(57) ABSTRACT

A wear resistant mounting post for a distributor cap in a rotary bell cup atomizer. The mounting post includes a flange separating a thin barbed end from a larger diameter central portion. The flange fits into a countersunk depression in the distributor cap to provide a flange surface which is flush with the distributor cap surface. Paint flowing radially outward across the distributor cap follows the flange surface to the central portion of the post. This design prevents the paint from undercutting the surface of the distributor cap, and ensures that any abrasive wear of the post is limited to the larger diameter central portion.

17 Claims, 5 Drawing Sheets

(56) References Cited

U.S. PATENT DOCUMENTS

| | | | | |
|---|---|---|---|---|
| 6,793,150 | B2 * | 9/2004 | Schaupp | B05B 3/1064 239/522 |
| 6,889,921 | B2 * | 5/2005 | Schaupp | B05B 5/0418 239/700 |
| 8,141,797 | B2 | 3/2012 | Vetter et al. | |
| 8,602,326 | B2 | 12/2013 | Seitz et al. | |
| 8,851,397 | B1 | 10/2014 | van der Steur et al. | |
| 9,782,789 | B2 * | 10/2017 | Bania | B05B 16/40 |
| 10,155,233 | B2 | 12/2018 | Seitz et al. | |
| 12,201,998 | B2 * | 1/2025 | Buck | B05B 3/1042 |
| 2003/0230650 | A1 * | 12/2003 | Schaupp | B05B 5/0407 239/690 |
| 2004/0000604 | A1 * | 1/2004 | Vetter | B05B 3/1014 239/700 |
| 2006/0138250 | A1 * | 6/2006 | Vetter | B05B 3/1014 239/255 |
| 2009/0008469 | A1 * | 1/2009 | Seitz | B05B 5/0407 239/3 |
| 2009/0255463 | A1 * | 10/2009 | Seitz | B05D 1/40 118/300 |

OTHER PUBLICATIONS

Screw Sizing and Strength: How to Pick the Right Screw, Jan. 13, 2017, US Microscrew, <https://www.usmicroscrew.com/2017/01/13/screw-sizing-and-strength-how-to-pick-the-right-screw/> (Year: 2017).*

Ballun, Understanding and Selecting Valve Flanges Pt. I: Design and Standards, Nov. 11, 2014, Valve Manufacturers Association, <https://www.valvemagazine.com/articles/understanding-and-selecting-valve-flanges-pt-i-design-and-standards> (Year : 2014).*

* cited by examiner

WEAR RESISTANT DISTRIBUTOR POST

CROSS-REFERENCE TO RELATED APPLICATIONS

This application claims the benefit of the priority date of U.S. Provisional Patent Application Ser. No. 63/137,279, titled WEAR RESISTANT DISTRIBUTOR POST, filed Jan. 14, 2021.

BACKGROUND

Field

The present disclosure relates to the field of robotic spray painting devices and, more particularly, to a mounting post for a distributor cap used in a rotary bell cup spray painting apparatus, where the mounting post has a flange which is countersunk into the distributor cap and prevents high-velocity paint from undercutting the mounting post into the distributor cap.

Discussion of the Related Art

The use of industrial robots for spray painting applications is well known. A number of painting and coating devices are known which have been developed for robotic spray painting. These include devices that feed paint or other fluid coating materials through a base unit towards an atomizing bell cup. The bell cup is an assembly that is attached to a hollow shaft and rotates in front of the base. The bell cup spins at high speeds, typically above 30,000 RPM. During painting operation, the coating material is advanced through the hollow shaft and into the bell cup assembly. The coating fluid contacts a distributor cap or plate that is arranged in the bell cup and causes the fluid to be dispersed by centrifugal force along the inner surface of the rotating bell cup. The coating fluid exits an annular area between the distributor cap and the bell cup inner surface and flows along the bell cup to an edge from which it departs the bell cup and travels to the workpiece being painted.

In bell cup painting devices of the type described above, it is known to attach the distributor cap to an interior of the base of the bell cup via mounting posts. One known design uses three such mounting posts. The mounting posts are attached to the interior base of the bell cup, such as by screw threads. The distributor cap is then attached to the mounting posts, such as by pressing barbed ends of the posts into holes in the distributor cap. This arrangement allows for straightforward assembly of the distributor cap into the bell cup, and provides a defined stand-off spacing of the distributor cap from the bell cup. The central portion of the mounting posts, which is located between the threaded end in the bell cup and the barbed end in the distributor cap, is typically made a larger diameter than the ends. This is done both to ensure the stand-off spacing mentioned above, and also because high-velocity paint impinges on the central portion of the mounting posts as the paint flows radially outward. The high velocity of the paint can cause abrasive wear of the mounting posts, which makes the larger diameter advantageous.

In some circumstances, however, paint can wear into the surface of the distributor cap, creating an undercut which allows the high-velocity paint to impinge on the barbed portion of the posts. This causes abrasive wear of a small diameter barbed portion of the posts, which is undesirable. Other distributor cap mounting arrangements are known, but none allow the simple and convenient assembly of the distributor cap into the bell cup of a barbed mounting post.

In light of the situation described above, there is a need for an improved distributor cap mounting post which prevents paint from impinging on and causing abrasive wear to a small diameter portion of the post.

SUMMARY

In accordance with the teachings of the present disclosure, a wear resistant mounting post for a distributor cap in a rotary bell cup atomizer is described and shown. The mounting post includes a flange separating a thin barbed end from a larger diameter central portion. The flange fits into a countersunk depression in the distributor cap to provide a flange surface which is flush with the distributor cap surface. Paint flowing radially outward across the distributor cap follows the flange surface to the central portion of the post. This design prevents the paint from undercutting the surface of the distributor cap, and ensures that any abrasive wear of the post is limited to the larger diameter portion.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a wear resistant mounting post for a distributor cap is merely exemplary in nature, and is in no way intended to limit the disclosed devices and techniques or their applications or uses.

It is well known to use industrial robots for spray painting workpieces such as automobile bodies. Various types of spray painting devices may be used on painting robots to deliver a controlled flow of paint or other coating fluid onto the workpiece in a consistent and well-distributed spray pattern. These devices include air-propelled spray devices and rotary bell cup atomizers, among others.

Figure 1:
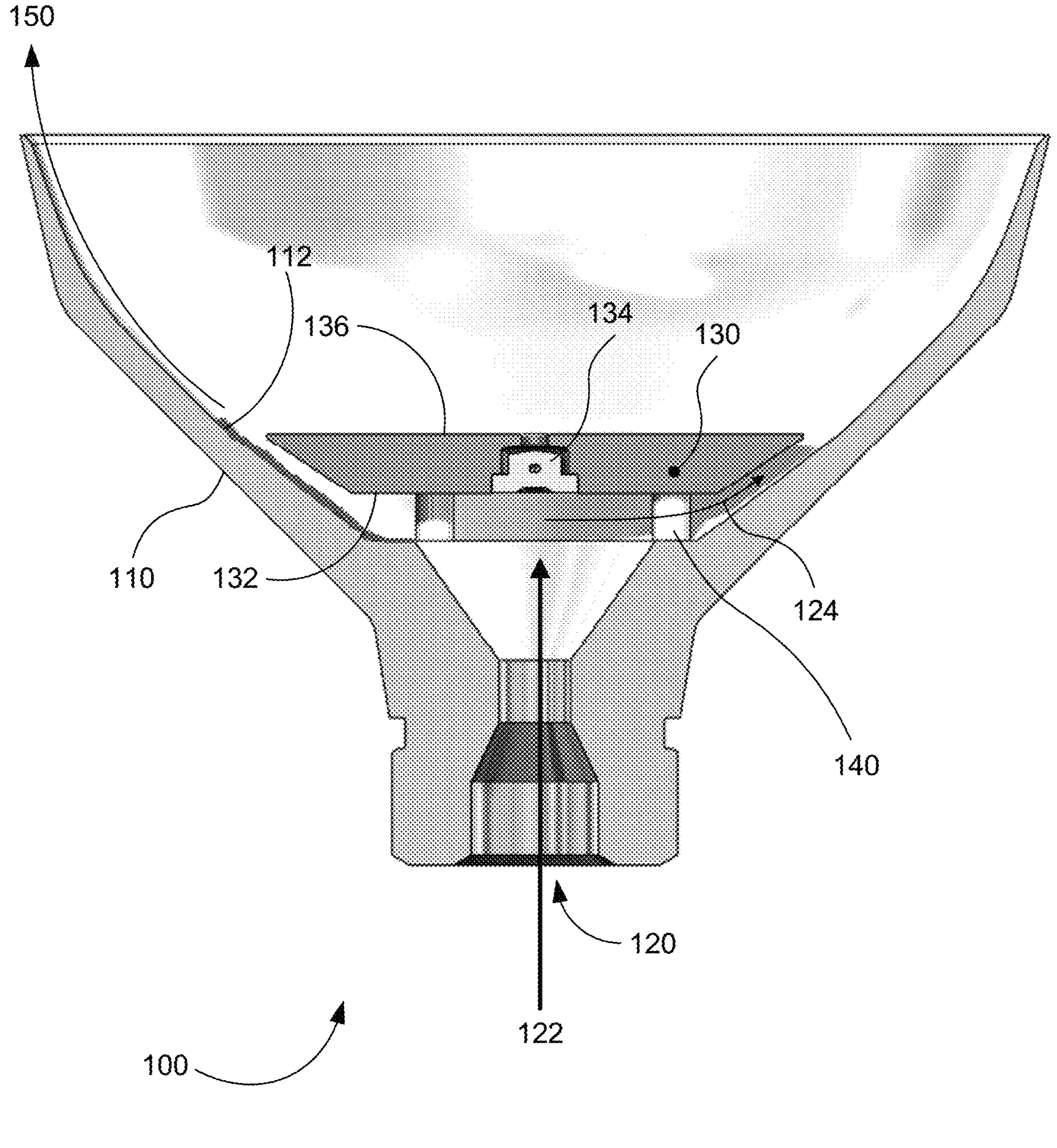
FIG. 1 is a cross-sectional illustration of a rotary bell cup spray painting apparatus of a type used on painting robots, as known in the art.

FIG. 1 is a cross-sectional illustration of a rotary bell cup spray painting apparatus 100 of a type used on painting robots, as known in the art. A bell cup 110 is rotatably mounted to a spray atomizer device which is in turn mounted to an outer arm or wrist of a robot. During spray painting operations, the bell cup 110 spins at high speed (typically tens of thousands of RPM) to distribute the paint or other coating fluid (hereinafter simply referred to as paint) in a well-defined spray pattern. The paint is introduced into the bell cup 110 through a central opening 120. The paint travels as indicated by arrow 122 until reaching a distributor cap 130, which is fixedly mounted in a position separated from the bell cup 110 by a plurality of mounting posts 140 (discussed later). The distributor cap 130 blocks the axial flow of the paint and causes the paint to spread in a radial direction along a front surface 132 of the distributor cap 130, as indicated by arrow 124. The distributor cap 130 is typically constructed of a plastic material such as acetal. An insert 134, constructed of a high-strength material such as titanium, is provided to block the axial flow of paint without being abrasively worn down by the paint. In some applications, a portion of the paint flows through the insert 134 by design and bleeds out to a rear surface 136 of the distributor cap 130.

All of the paint is flung radially outward from the front surface 132 and the rear surface 136 of the distributor cap 130 due to the high rotational speed of the bell cup apparatus 100. From the distributor cap 130, the paint lands on an inner surface 112 of the bell cup 110. The rotation of the bell cup 110 causes the paint to flow along the inner surface 112 until being expelled from the bell cup 110 as indicated by arrow 150. The paint leaves the bell cup 110 around its entire circumference as a pattern of finely atomized droplets which are deposited on the workpiece. An electrostatic charge may be applied to improve the deposition of the paint droplets on the workpiece, as known in the art.

Figure 2:
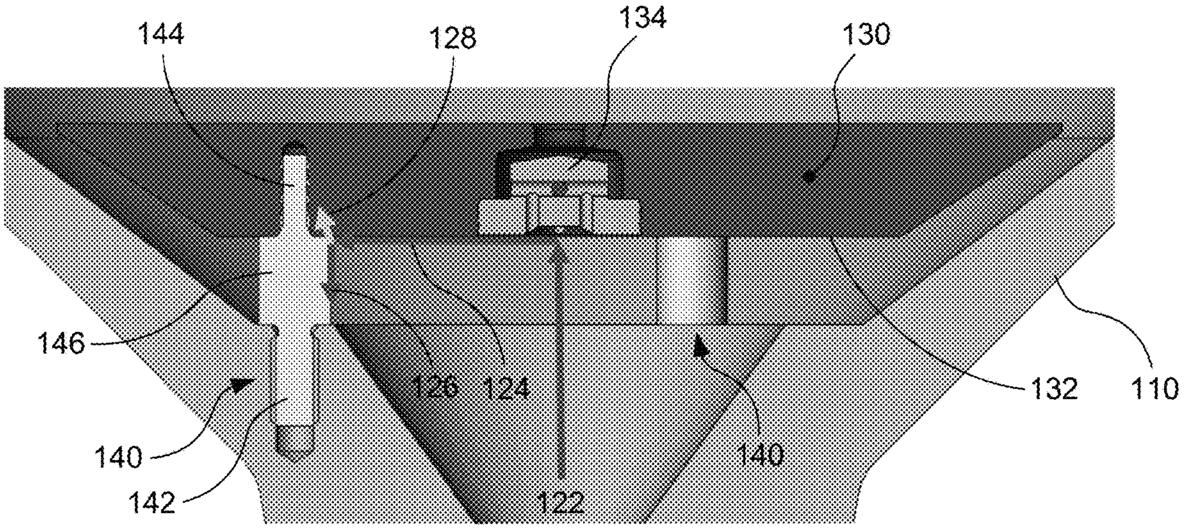
FIG. 2 is a cross-sectional illustration of the rotary bell cup of FIG. 1 showing how high-velocity spreads radially on a surface of a distributor cap and impinges on a mounting post.

FIG. 2 is a cross-sectional illustration of the rotary bell cup 110 of FIG. 1 showing how high-velocity paint spreads radially on a surface of a distributor cap and impinges on a mounting post. In addition to the bell cup 110 (cropped in FIG. 2), the distributor cap 130 having the front surface 132 and the insert 134 are shown in FIG. 2 as they were in FIG. 1. Two of the mounting posts 140 are also shown in FIG. 2; the mounting post 140 at the left is shown in cross-section, as it is positioned at the section plane of FIG. 2; the mounting post 140 at the right is only partially visible, as its two ends are obstructed by the bell cup 110 and the distributor cap 130 in FIG. 2. Three of the mounting posts 140 are used to attach the distributor cap 130 to the bell cup 110, where the third mounting post 140 is not visible in the cross-section of FIG. 2.

One known design of the mounting posts 140 has a first end 142, a second end 144 and a central portion 146. The first end 142 is attached to the interior base of the bell cup 110, such as by screw threads. The second end 144 has a barbed shape and is pressed into holes in the distributor cap 130. This arrangement allows for straightforward assembly of the distributor cap 130 to the bell cup 110, and the larger diameter central portion 146 provides a defined stand-off spacing of the distributor cap 130 from the bell cup 110.

As discussed earlier, paint from the robot flows into the bell cup 110 along the arrow 122, impinges on the insert 134 and spreads radially outward across the front surface 132 of the distributor cap 130, as indicated by the arrow 124 (which was shown on the right side of FIG. 1). Most of the paint flowing radially outward across the front surface 132 encounters no obstacles on its way to the peripheral edge of the distributor cap 130 where it is flung outward onto the inner surface 112 of the bell cup 110. However, a small portion of the paint encounters one of the mounting posts 140 as it flows outward across the front surface 132.

The paint following the arrow 124 will be forced to flow around the central portion 146 when the paint encounters the mounting post 140. In addition to the paint spreading circumferentially around the central portion 146, the high-velocity splash will cause some of the paint to deflect axially as indicated by arrows 126 and 128. The paint following the arrow 126 will soon find its way around the central portion 146 and out to the bell cup 110. The paint following the arrow 128 has axial energy which must first be deflected by the front surface 132 of the distributor cap 130. Depending on the flow rate of the paint, the spin rate of the bell cup 110, the type of paint (e.g., metal-flake) and other factors, over time the paint can abrasively wear the front surface 132 of the distributor cap 130 in the immediate vicinity of the mounting posts 140. This wear undermines the central portion 146 of the mounting post 140, and eventually allows high-velocity paint to impinge on the second end 144 where it meets the central portion 146. The high-velocity flow of paint can then cause abrasive wear to the second end 144 of the mounting post 140, which is not desirable.

Figure 3:
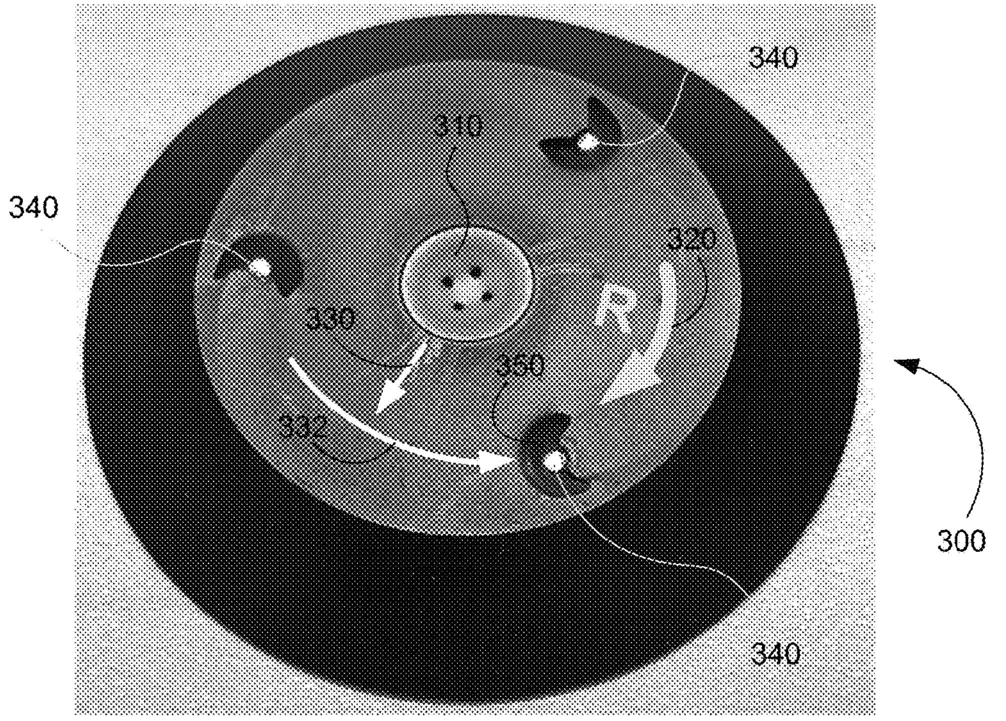
FIG. 3 is an image of a distributor cap of the type shown in FIGS. 1 and 2, showing wear patterns in the distributor cap caused by the flow of high-velocity paint as illustrated in FIG. 2.

FIG. 3 is an image of a distributor cap 300 of the type shown in FIGS. 1 and 2, showing wear patterns caused by the flow of high-velocity paint as illustrated in FIG. 2. An insert 310 is shown in the center of the distributor cap 300, as discussed earlier. The distributor cap 300 was installed in a bell cup and the assembly rotated in a direction R indicated by arrow 320. The high-speed rotation caused paint to flow radially outward along the front surface of the distributor cap 300 as indicated by arrow 330, and also to take on a tangential component of velocity (relative to the distributor cap 300) as indicated by arrow 332.

A portion of three mounting posts 340 are shown in FIG. 3. The arrangement of the mounting posts 340 in attaching the distributor cap 300 to the bell cup was discussed earlier. In a vicinity of each of the mounting posts 340, an undercut area 350 is visible. The undercut area 350 is a crescent-shaped area where the high-velocity paint, particularly the tangential component of the paint flow indicated by the arrow 332, has abrasively worn the front surface of the distributor cap 300. It can be seen that the undercut area 350 is concentrated around the mounting post 340 on the side of the mounting post 340 where the tangential flow of paint impinges. On the specimen shown in the image of FIG. 3, the undercut areas 350 developed to the point where the high-velocity paint reached the small-diameter barbed end of the mounting posts 340. The paint then proceeded to cut almost all of the way through the small-diameter barbed ends of the mounting posts 340.

The present disclosure describes a new distributor cap mounting post which is designed to prevent the high-velocity flow of paint from cutting into the surface of the distributor cap and impinging on the small-diameter portion of the post as illustrated in FIG. 3. This is discussed in detail below.

Figure 4:
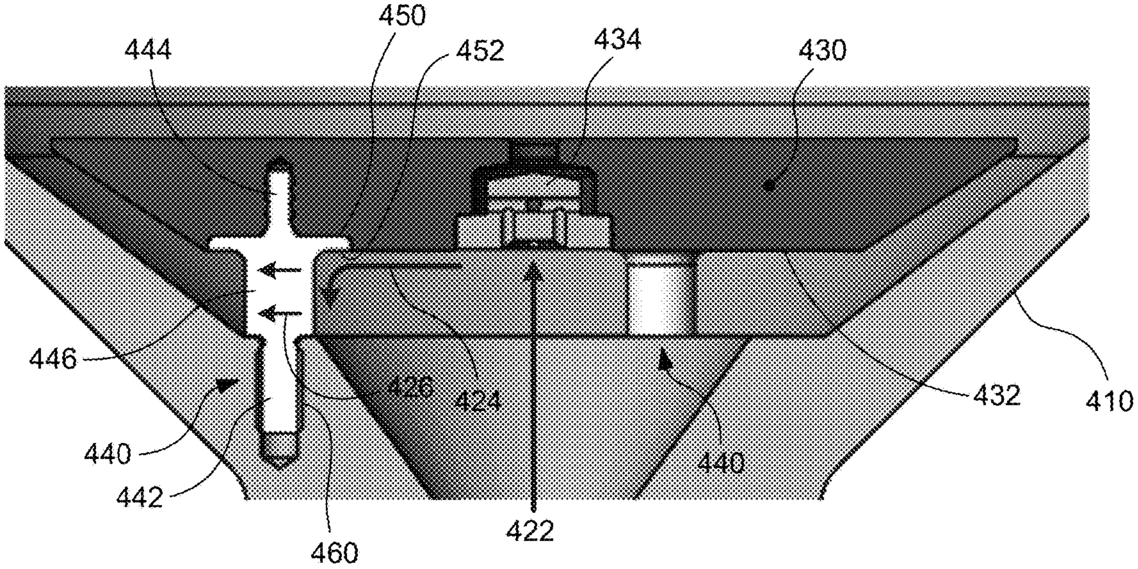
FIG. 4 is a cross-sectional illustration of a rotary bell cup with a distributor cap and mounting post having a flange designed to prevent the flow of high-velocity paint from wearing into the surface of the distributor cap, according to an embodiment of the present disclosure.

FIG. 4 is a cross-sectional illustration of a rotary bell cup with a distributor cap and mounting post having a flange designed to prevent the flow of high-velocity paint from wearing into the surface of the distributor cap, according to an embodiment of the present disclosure. A bell cup 410 is equivalent to the bell cup 110 of FIGS. 1 and 2 discussed earlier. A distributor cap 430 is mounted in the interior of the bell cup 410. Paint from the robot flows into the bell cup atomizer assembly as indicated by arrow 422 and impinges on an insert 434 in the distributor cap 430, in the same manner discussed earlier.

A plurality of mounting posts 440 are used to fixedly mount the distributor cap 430 in position in the bell cup 410. Two of the mounting posts 440 are shown in FIG. 4; the mounting post 440 at the left is shown in cross-section, as it is positioned at the section plane of FIG. 4; the mounting post 440 at the right is only partially visible, as its two ends are obstructed by the bell cup 410 and the distributor cap 430 in FIG. 4. In this exemplary embodiment, three of the mounting posts 440 are used to attach the distributor cap 430 to the bell cup 410, where the third mounting post 440 is not visible in FIG. 4.

Each of the mounting posts 440 has a first end 442, a second end 444 and a central portion 446. The first end 442 is attached to the interior base of the bell cup 410, such as by screw threads, or by inserting a barbed shape of the first end 442 into a plastic insert 460 which is pressed into a hole in the bell cup 410. The second end 444 has a barbed shape and is pressed into holes in the distributor cap 430. The larger diameter central portion 446 provides a defined standoff spacing of the distributor cap 430 from the bell cup 410. The mounting post 440 also includes a disc-shaped flange 450 at the junction of the second end 444 and the central portion 446, as shown. The flange 450 fits into a corresponding countersink recess in the distributor cap 430, so that an exposed surface 452 of the flange 450 is flush with a front surface 432 of the distributor cap 430. Because the flange 450 is flush with the front surface 432 or just below it, the flange 450 does not redirect the flow of paint or experience any impingement from the paint.

The flange 450 is designed to control the flow of high-velocity paint so that the paint does not undercut the mounting post into the distributor cap 430. Instead, the high-velocity paint flows along the exposed surface 452 and impinges on the mounting post 440 (radially and tangentially, as discussed above) at the base of the central portion 446, causing the paint to follow the path indicated by arrow 424. The paint then quickly flows around the central portion 446 and flies off to the bell cup 410, as indicated by arrows 426.

The flange 450 ensures that the paint which strikes the mounting post 440 does not deflect (due to the splash effect) into the plastic distributor cap 430, as with the current design illustrated in FIG. 2. Rather, all of the splash energy of the paint striking the mounting post 440 is felt by the mounting post 440 itself, which is a metal component (titanium, stainless steel, or other suitable metal) and is much more resistant to abrasive wear than the plastic distributor cap 430. In addition, a fillet 454 (FIG. 5) at the junction of the central portion 446 and the flange 450 aids in deflecting the flow of paint as indicated by the arrow 424 until the paint flows around the central portion 446 as indicated by the arrows 426.

Figure 5:
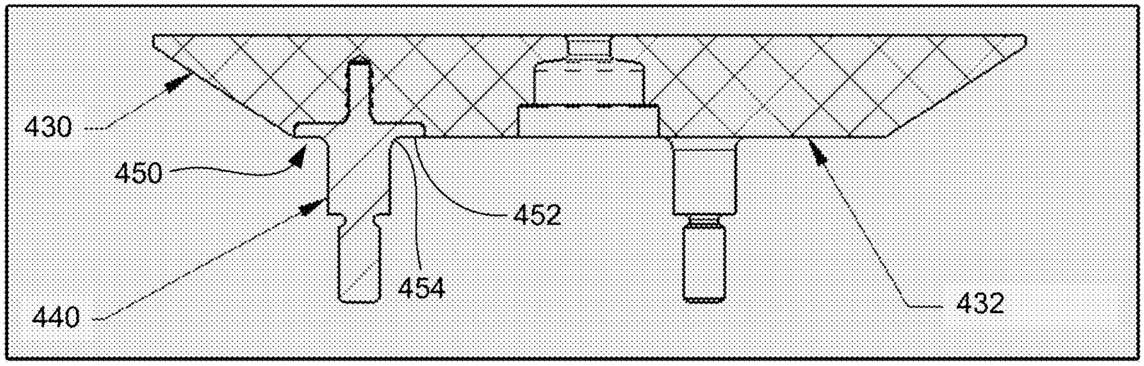
FIG. 5 is a cross-sectional illustration of the distributor cap and mounting post of FIG. 4, according to an embodiment of the present disclosure.

FIG. 5 is a cross-sectional illustration of the distributor cap 430 and the mounting post 440 of FIG. 4, according to an embodiment of the present disclosure. FIG. 5 simply provides another illustration of these components without the surrounding elements and flow arrows of FIG. 4. The mounting post 440 having the flange 450 are shown in FIG. 5, as discussed above. The flange 450 fits into a corresponding countersink recess in the distributor cap 430, so that the exposed surface 452 of the flange 450 is flush with the front surface 432 of the distributor cap 430, as shown. The fillet 454 is also shown in FIG. 5. Tolerances may be established such that the exposed surface 452 is slightly "below" the front surface 432 (set into the countersink recess), so that the paint does not impinge on an outer peripheral edge of the flange 450.

Figure 6:
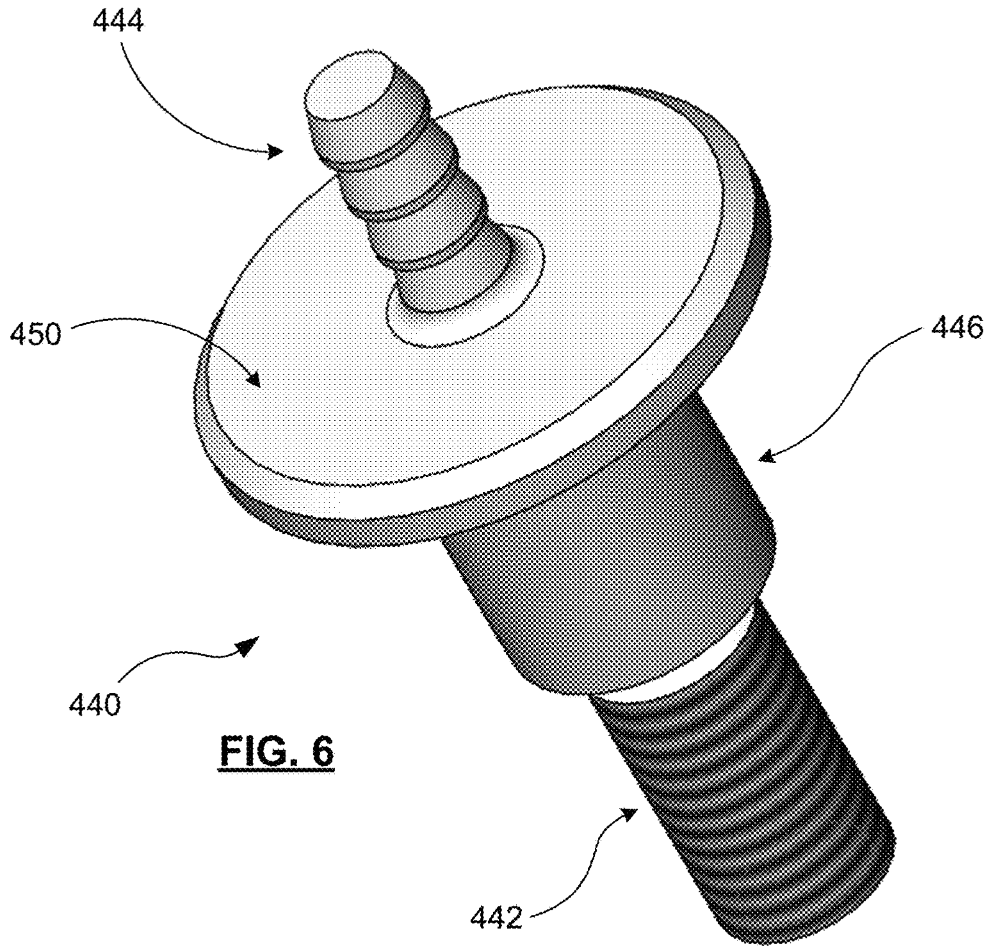
FIG. 6 is an isometric view illustration of the mounting post shown in FIGS. 4 and 5, where the mounting post flange directs the flow of high-velocity paint in a desired direction, according to an embodiment of the present disclosure.
Figure 7:
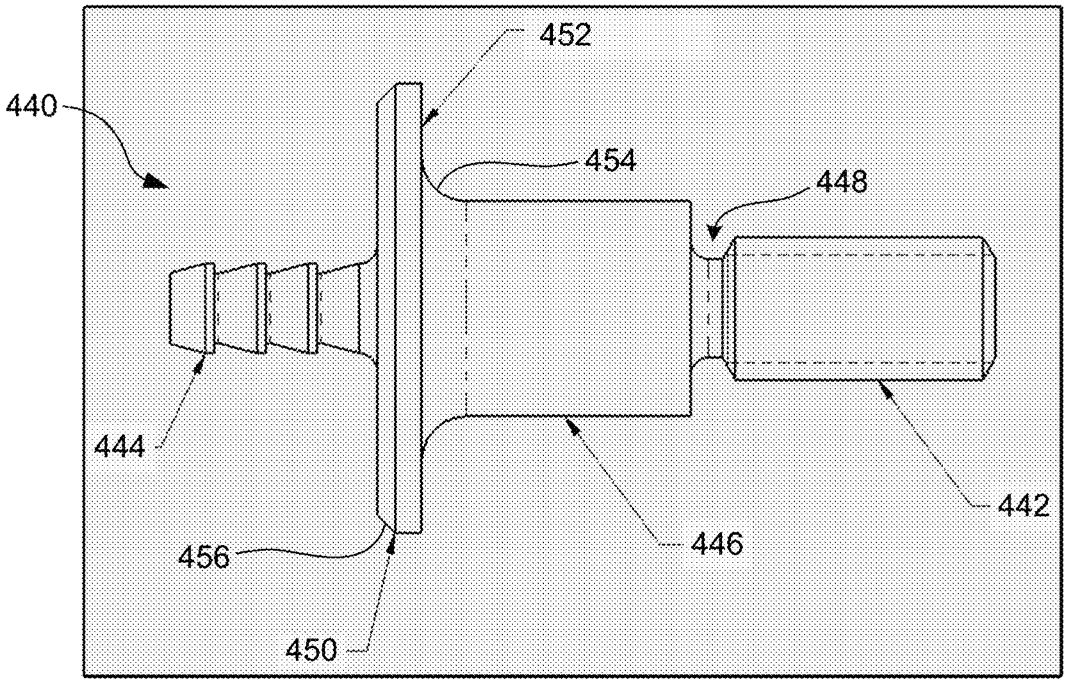
FIG. 7 is a side view illustration of the mounting post of FIG. 6, showing details of the flange and other features of the mounting post, according to an embodiment of the present disclosure.

FIG. 6 is an isometric view illustration of the mounting post 440 shown in FIGS. 4 and 5, including the mounting post flange 450 which directs the flow of high-velocity paint in a desired direction, according to an embodiment of the present disclosure. FIG. 7 is a side view illustration of the mounting post 440, showing details of the flange 450 and other features, according to an embodiment of the present disclosure.

The first end 442, the second end 444 and the central portion 446, discussed earlier, are shown in FIGS. 6 and 7. An undercut 448 may be provided at the base of the first end 442, to avoid stress concentration and to provide for positive seating of the central portion 446 against the bell cup 410. The flange 450 is also shown in FIGS. 6 and 7, with the exposed surface 452 and the fillet 454 shown in FIG. 7. In addition, a bevel 456 may be provided on the periphery of the flange 450 opposite the exposed surface 452, in order to improve seating of the flange 450 into the countersink recess in the distributor cap 430.

In one embodiment, the mounting post 440 has reference features and dimensions as follows; the first end 442 is threaded with a male machine screw thread having a diameter of about 1.5 mm; the second end 444 has a barbed cylindrical shape and a diameter of about 1.0 mm; the central portion 446 is cylindrical and has a diameter of about 2.5-3.0 mm; and the flange 450 is disc-shaped with a thickness of less than 1 mm and an outside diameter of about 5 mm. The mounting post 440 is preferably constructed of a single piece of a high strength corrosion resistant material such as titanium or stainless steel. The specifications listed in this paragraph are merely exemplary. Dimensions may be larger or smaller depending on the application and the bell cup and distributor cap sizes.

Figure 8:
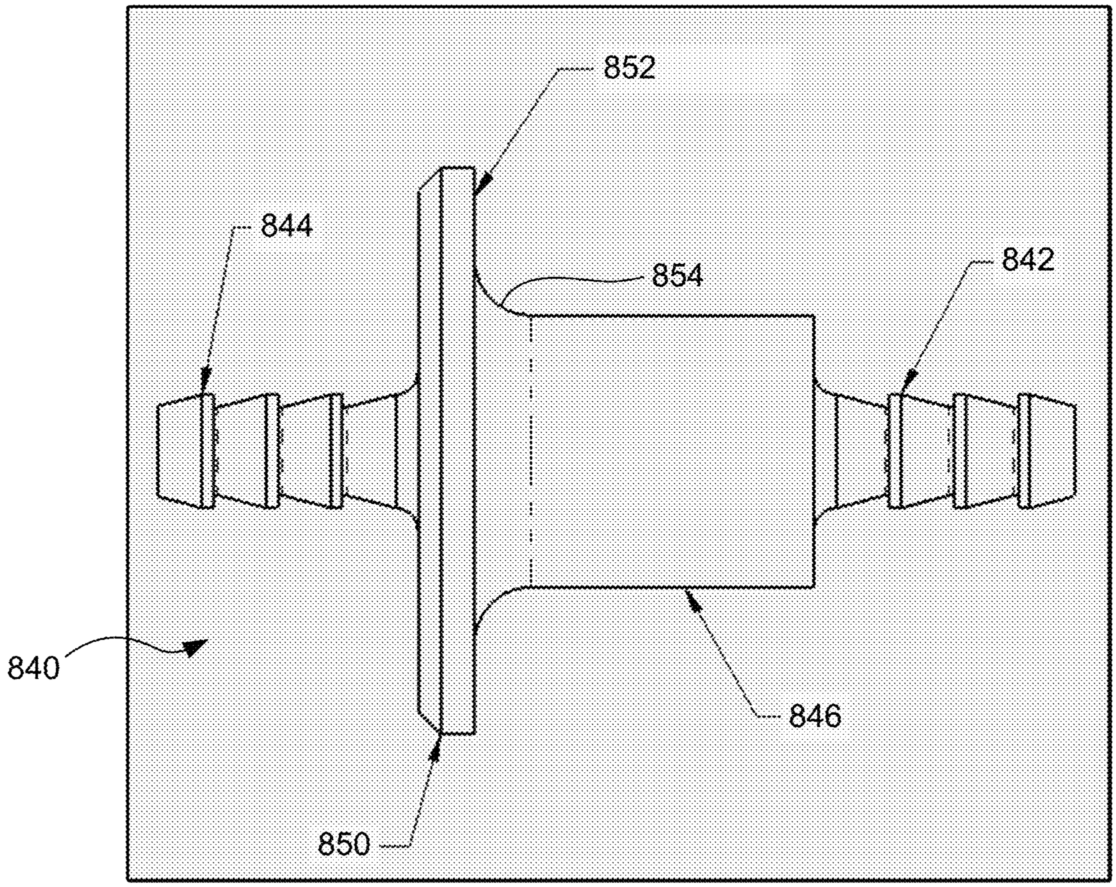
FIG. 8 is a side view illustration of a second design of a distributor cap mounting post having a flange for preventing abrasive wear of the distributor cap and the post, according to another embodiment of the present disclosure.

FIG. 8 is a side view illustration of a second design of a distributor cap mounting post 840 having a flange 850 for preventing abrasive wear of the distributor cap and the post, according to another embodiment of the present disclosure. The mounting post 840 is generally the same as the mounting post 440 discussed above, except for a first end 842 which is barbed rather than threaded. The barbed design of the first end 842 allows for the use of the mounting post 840 in applications where a press fit into the base of the bell cup is employed rather than a threaded installation. For example, a hollow cylindrical plastic insert, shown in FIG. 4 as the plastic insert 460, could be placed in a cylindrical hole in the base of the bell cup, and the first end 842 of the mounting post 840 then pressed into the plastic insert 460.

The mounting post 840 has a second end 844 and a central portion 846 which are the same at their equivalent features on the mounting post 440 of FIGS. 4-7. Likewise, the flange 850 on the mounting post 840 includes an exposed surface 854 and a fillet 854 in the same manner as the equivalent features on the mounting post 440, where the flange 850 causes the high-velocity paint to flow in the desired manner around the central portion 846 of the mounting post 840, rather than undercutting the mounting post into the distributor cap.

As outlined above, the disclosed embodiments of distributor cap mounting posts provide significant advantages over existing mounting post designs. Specifically, the mounting post flange which is countersunk into a recess in the face of the distributor cap improves the fluid dynamics of paint flow around the mounting post, and solves the problem of abrasive wear of the distributor cap which can lead to wear-through of the barbed end of existing mounting post designs.

While a number of exemplary aspects and embodiments of wear resistant mounting posts for a distributor cap in a rotary bell cup atomizer have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A mounting post for attaching a distributor cap to a rotary bell cup in a spray painting atomizer system, said mounting post comprising:

- a first end configured for being fixedly embedded into an interior of a base portion of the rotary bell cup;
- a second end opposite the first end and configured for being fixedly embedded into the distributor cap;
- a cylindrical central portion located between the first end and the second end, the central portion having a minimum outer diameter which is larger than an outer diameter of the first end and an outer diameter of the second end, where the central portion is positioned in a stand-off space where coating fluid flows between the distributor cap and the rotary bell cup during operation of the atomizer system; and
- a disc-shaped flange located between the second end and the central portion, the flange having parallel front and rear faces and an outer diameter which is larger than the minimum outer diameter of the central portion, and when the second end of the mounting post is embedded into the distributor cap, the front face of the flange exposed to flow of the coating fluid is parallel to and flush with or recessed below a surrounding front surface of the distributor cap.

2. The mounting post according to claim 1 including a fillet at a junction of the central portion and the front face of the flange.

3. The mounting post according to claim 1 wherein the second end has a barbed shape configured for insertion into a hole in the distributor cap.

4. The mounting post according to claim 1 wherein the first end has a male screw thread configured for installation into a female threaded hole in the base portion of the rotary bell cup.

5. The mounting post according to claim 1 wherein the first end has a barbed shape configured for being pressed into a plastic insert located in a hole in the base portion of the rotary bell cup.

6. The mounting post according to claim 1 wherein the mounting post is constructed of a single piece of titanium or stainless steel.

7. A distributor cap assembly for use in a bell cup in a spray painting rotary atomizer, said distributor cap assembly comprising:

- a plurality of mounting posts, each mounting post including a first end configured for being fixedly embedded into an interior of a base portion of the bell cup, a second end opposite the first end and having a barbed shape, a cylindrical central portion located between the first end and the second end, the central portion having a minimum outer diameter which is larger than an outer diameter of the first end and an outer diameter of the second end, and a disc-shaped flange located between the second end and the central portion, the flange having parallel front and rear faces and an outer diameter which is larger than the minimum outer diameter of the central portion; and
- a distributor cap having a pre-formed hole for receiving the second end of each of the mounting posts, thereby fixing the distributor cap in a position in the interior of the bell cup to deflect a flow of coating fluid radially outward, where the central portion of the mounting posts is positioned in a stand-off space where the coating fluid flows between the distributor cap and the bell cup during operation of the atomizer system, and where the distributor cap further includes a countersunk recess surrounding each of the pre-formed holes, said recess having a size and shape configured to receive the flange such that, when the second end of the mounting post is embedded into the distributor cap, the front face of the flange exposed to flow of the coating fluid is parallel to and flush with or recessed below a surrounding front surface of the distributor cap.

8. The distributor cap assembly according to claim 7 wherein each of the mounting posts includes a fillet at a junction of the central portion and the front face of the flange.

9. The distributor cap assembly according to claim 7 wherein the plurality of mounting posts is three mounting posts.

10. The distributor cap assembly according to claim 7 wherein each of the mounting posts is constructed of a single piece of titanium or stainless steel, and the distributor cap is constructed of a plastic material.

11. The distributor cap assembly according to claim 7 wherein the distributor cap includes a metallic insert at its center, where the flow of coating fluid impinges on the insert and then spreads radially outward on a front surface of the distributor cap.

12. The distributor cap assembly according to claim 7 wherein the first end of each of the mounting posts has a male screw thread configured for installation into a female threaded hole in the base portion of the bell cup, or the first end has a barbed shape configured for being pressed into a plastic insert located in a hole in the base portion of the bell cup.

13. A rotary atomizer for use on a spray painting robot, said rotary atomizer comprising:

- a bell cup, said bell cup mounted to a spray atomizer device on an outer arm or wrist of the spray painting robot, said bell cup configured to spin on its mounting about a central axis;
- a plurality of mounting posts, each mounting post including a first end configured for being fixedly embedded into an interior of a base portion of the bell cup, a second end opposite the first end and having a barbed shape, a cylindrical central portion located between the first end and the second end, the central portion having a minimum outer diameter which is larger than an outer diameter of the first end and an outer diameter of the second end, and a disc-shaped flange located between the second end and the central portion, the flange having parallel front and rear faces and an outer diameter which is larger than the minimum outer diameter of the central portion; and a distributor cap having a plurality of pre-formed holes, one hole for receiving the second end of each of the mounting posts, thereby fixing the distributor cap in a position in the interior of the bell cup to deflect a flow of coating fluid radially outward, where the central portion of the mounting posts is positioned in a stand-off space where the coating fluid flows between the distributor cap and the bell cup during operation of the rotary atomizer, and where the distributor cap further includes a countersunk recess surrounding each of the pre-formed holes, said recess having a size and shape configured to receive the flange such that, when the second end of the mounting post is embedded into the distributor cap, the front face of the flange exposed to flow of the coating fluid is parallel to and flush with or recessed below a surrounding front surface of the distributor cap.

14. The rotary atomizer according to claim 13 wherein each of the mounting posts includes a fillet at a junction of the central portion and the front face of the flange.

15. The rotary atomizer according to claim 13 wherein each of the mounting posts is constructed of a single piece of titanium or stainless steel, and the distributor cap is constructed of a plastic material.

16. The rotary atomizer according to claim 13 wherein the distributor cap includes a metallic insert at its center, where the flow of coating fluid impinges on the insert and at least a portion of the flow of coating fluid spreads radially outward on a front surface of the distributor cap.

17. The rotary atomizer according to claim 13 wherein the first end of each of the mounting posts has a male screw thread configured for installation into a female threaded hole in the base portion of the bell cup, or the first end has a barbed shape configured for being pressed into a plastic insert located in a hole in the base portion of the bell cup.

* * * * *